United States Patent [19]
Weber

[11] Patent Number: 6,126,224
[45] Date of Patent: Oct. 3, 2000

[54] SUN SCREEN FOR A MOTOR VEHICLE

[75] Inventor: Norbert Weber, Bondorf, Germany

[73] Assignee: DaimlerChrysler AG, Stuttgart, Germany

[21] Appl. No.: 09/245,722

[22] Filed: Feb. 8, 1999

[30] Foreign Application Priority Data

Feb. 7, 1998 [DE] Germany ............................ 198 04 984

[51] Int. Cl.$^7$ ....................................................... B60J 3/00
[52] U.S. Cl. .................. 296/97.5; 296/97.1; 296/190.09; 296/210; 160/DIG. 3
[58] Field of Search ............................. 296/208, 190.09, 296/97.1, 97.5, 210; 454/69; 160/DIG. 3

[56] References Cited

U.S. PATENT DOCUMENTS

| | | | |
|---|---|---|---|
| 4,120,527 | 10/1978 | Lawrence | 296/190.09 |
| 4,721,031 | 1/1988 | Nakata et al. | 296/190.09 |
| 4,807,523 | 2/1989 | Radtke et al. | 296/97.5 X |
| 5,296,678 | 3/1994 | Schnorf | 296/97.5 X |

FOREIGN PATENT DOCUMENTS

3316817C2 11/1984 Germany.
3438360 5/1985 Germany ................................ 296/208

*Primary Examiner*—Dennis H. Pedder
*Assistant Examiner*—Jason Morrow
*Attorney, Agent, or Firm*—Evenson, McKeown, Edwards & Lenahan, P.L.L.C.

[57] ABSTRACT

A sun screen of a motor vehicle is swivellable at least about an axis extending essentially transversely with respect to a windshield of the motor vehicle between a first end position, in which the sun screen extends parallel to a vehicle roof, and a second end position, in which the sun screen extends parallel to the windshield. Such a sun screen has ventilation openings through which an exchange of air can take place between an occupant interior and an interior of the sun screen which can be connected to an air conditioner of the motor vehicle. A recess is provided in a roof-side exterior side of the sun screen and communicates with the interior of the sun screen. A connection opening of the air conditioner is arranged in the vehicle interior in the vehicle roof. The sun screen is positionable in its first end position on the vehicle roof so that the connection opening and the recess of the sun screen cover one another.

20 Claims, 2 Drawing Sheets

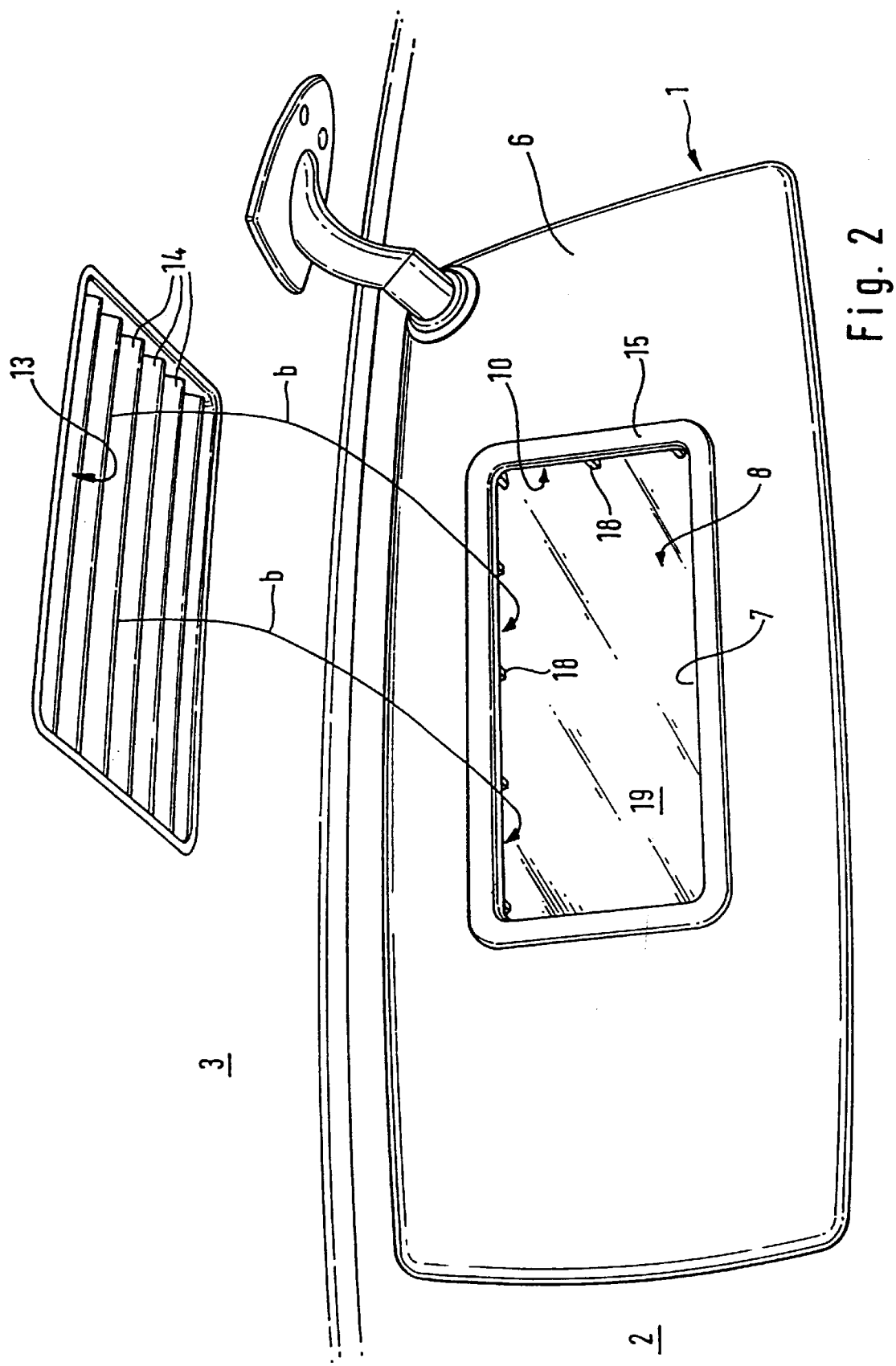

SUN SCREEN FOR A MOTOR VEHICLE

This application claims the priority of German patent application No. 198 04 984.6, filed Feb. 7, 1998, the disclosure of which is expressly incorporated by reference herein.

BACKGROUND AND SUMMARY OF THE INVENTION

The present invention relates to a sun screen for a motor vehicle which is swivellable about an axis extending essentially transversely with respect to a windshield of the motor vehicle between first and second end positions. In the first end position, the sun screen extends essentially parallel to a vehicle roof, and in the second end position, the sun screen extends essentially parallel to the windshield. The sun screen has ventilation openings through which an exchange of air can take place between an occupant interior and an interior of the sun screen, which can be connected to an air conditioner of the motor vehicle.

A sun screen of this type is known from German Patent Document DE 33 16 817 C2. This known sun screen is constructed as a hollow body which permits an air exchange between the interior of the sun screen and the vehicle interior by way of a plurality of openings in one of the exterior sides of the sun screen. The interior of this known sun screen is connected to an air conditioner by way of a tube by which the sun screen is adjustably fastened to the vehicle. In this manner, feeding or removal of air can selectively be achieved with respect to the vehicle interior.

The present invention provides a suitable further development for a sun screen of the initially mentioned type.

The sun screen according to the invention includes a roof-side exterior side in which a recess is provided. The recess communicates with the interior of the sun screen and, in the vehicle interior, a connection opening of an air conditioner is arranged in the vehicle roof. The sun screen, in a first end position, is positionable on the vehicle roof such that the connection opening and the recess in the sun screen cover one another. An opening for air exchange is provided in the roof-side exterior side of the sun screen and is connected with a connection opening of the air conditioner, which is arranged in the roof of the vehicle, only when the sun screen is folded upward and is essentially parallel to the vehicle roof. This permits the construction of a large-surface air connection of the sun screen to the air conditioner of the vehicle so that even with a relatively large air volume flow, only low flow rates occur. This results, for example, in increased comfort, since an air flow at a lower flow rate does not cause disturbing noises. In addition, it is possible to use the connection opening integrated in the vehicle roof directly as an additional venting opening of the air conditioner when the sun screen is folded down. With a large opening arranged in the roof area, for example, a fast discharge of cigarette smoke can be carried out.

In an advantageous further development of the sun screen according to the invention, a plate arranged in a sunk manner with respect to the roof-side exterior side of the sun screen and extending essentially parallel to this exterior side may be provided in the recess. A gap opening is constructed between the exterior edge of this plate and the circumference of the recess. The gap opening communicates with the interior of the sun screen. This type of gap opening can ensure a large flow cross-section. In addition, the space available on the plate can be advantageously utilized. In particular, a make-up mirror can be mounted on the plate.

In another preferred embodiment of the sun screen according to the invention, the exterior side of the sun screen can be formed, at least in areas, of an air-permeable material, or can be equipped with an air-permeable coating or layer, so that the ventilation openings of the sun screen are covered. If the ventilation openings lead out directly on the exterior side of the sun screen, then when fresh air is fed into the vehicle interior, air flows (drafts) may develop. This may bother the occupants at least over an extended period of time. In contrast, by way of the suggested measures, it is possible to diffusely blow fresh air into the vehicle interior in a more or less undirected manner. This can ensure a fresh air supply or air circulation without the formation of bothersome flows in the vehicle interior.

The connection opening provided in the roof or ceiling of the vehicle may be provided with adjustable lamellae. Consequently, when the sun screen is adjusted out of its first end position, an additional air feeding and removal nozzle is available for the air conditioner, which has an adjustable flow quantity and an adjustable flow direction.

Additional important characteristics and advantages of the invention are apparent from the drawings and the following description of the preferred embodiments.

BRIEF DESCRIPTION OF THE DRAWINGS

FIG. 2 is a schematic perspective top view of a sun screen according to the invention folded down from its first end position.

DESCRIPTION OF THE PREFERRED EMBODIMENTS

Figure 1:
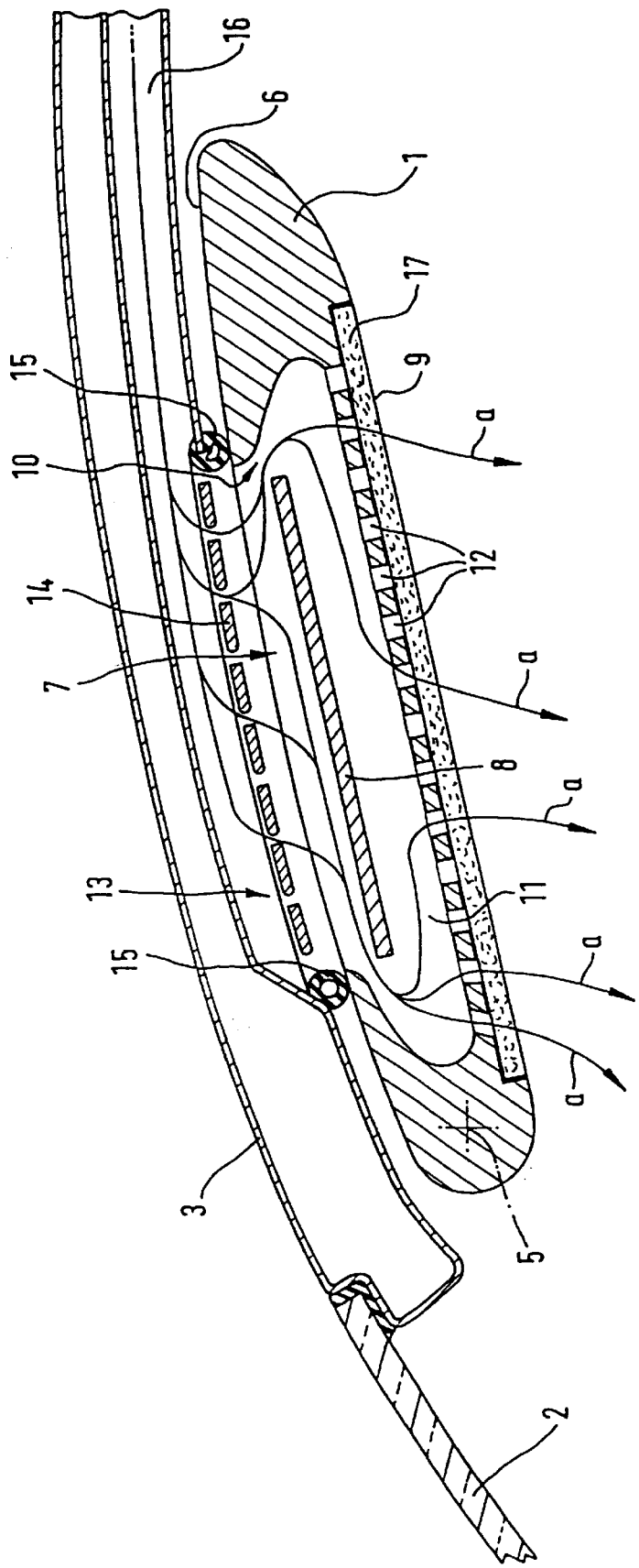
FIG. 1 is a schematic sectional lateral view of a sun screen according to the invention in a first end position in which the sun screen extends essentially parallel to a vehicle roof.

FIG. 1 shows a sun screen 1 according to the invention arranged in a conventional manner in the area of a windshield 2 on the interior side of a vehicle roof 3 in a vehicle interior 4 of a motor vehicle which is otherwise not shown. The sun screen 1 is swivellable about an axis 5 extending approximately transversely to the longitudinal direction of the vehicle and can be arbitrarily adjusted between a first end position, in which it extends essentially parallel to the interior side of the vehicle roof 3, and a second end position, in which it extends essentially parallel to the windshield 2.

On an exterior side 6 of the sun screen 1, which faces the vehicle roof 3, a recess 7 in which a plate 8 is arranged is provided. This plate 8 is embedded with respect to adjoining areas of the exterior side 6 and has a course which is essentially parallel to the exterior side 6. Between the circumference framing the recess 7 and the circumference or the exterior edge of the plate 8, a gap opening 10 is constructed which extends along the exterior edge of the plate 8 and through which the recess 7 communicates with an interior 11 of the sun screen 1. In addition, the interior 11 of the sun screen 1 communicates by way ventilation openings 12 with an exterior side 9 of the sun screen 1 facing the interior 4 of the vehicle.

Furthermore, the interior 11 of the sun screen 1 communicates by way of the gap opening 10 and the recess 7 with a connection opening 13 of an air conditioner of the vehicle, which is otherwise not shown. The connection opening 13 faces the vehicle interior 4 and is arranged in the roof 3 of the vehicle. The connection opening 13 is also provided with adjustable lamellae 14 which, in this embodiment, extend approximately transversely to the longitudinal direction of the vehicle and may be adjustable for regulating the quantity and direction of air volume flow.

In the area bordering the connection opening 13, corresponding to FIG. 1, a ring seal or sealing lip 15 is mounted on the vehicle roof 3 or on the vehicle ceiling. This ring seal or sealing lip 15 is in sealing contact with the circumference of the recess 7 on the exterior side 6 of the sun screen 1 when the sun screen 1 is in the first end position shown in FIG. 1.

Various arrows a symbolize a ventilation situation in FIG. 1 in which, for example, cooled fresh air is supplied by the air conditioner to the connection opening 13 by way of a corresponding flow duct 16 in the vehicle roof 3. This fresh air flows out of the connection opening 13 through the lamellae 14 and flows onto the sunk plate 8 of the sun screen 1, where it is deflected into the gap opening 10. Through the gap opening 10, the fed air arrives in the interior 11 of the sun screen 1, where it is distributed to the ventilation openings 12. Through the plurality of ventilation openings 12, the supplied fresh air can then enter from above into the vehicle interior 4.

In the embodiment illustrated in FIG. 1, an insert 17 is integrated in the exterior side 9 of the sun screen 1 facing the vehicle interior 4; this insert 17 covers all ventilation openings 12 and consists of an air-permeable material. In this manner, a jet-type directed flow cannot form through the ventilation openings 12. On the contrary, a relatively diffuse, undirected outflow of air is achieved.

FIG. 2 clearly shows the gap opening 10 formed in the circumferential area of the recess 7 between the plate 8 and the exterior side 6 of the sun screen 1 facing the vehicle roof 3. In addition, the arrows b symbolize a flow path which may exist when the sun screen 1 takes up its first end position illustrated in FIG. 1.

For holding the plate 8, webs 18 are provided to connect the plate 8 in the area of its outer edge with the interior circumference of the recess 7. In the preferred embodiment illustrated in FIG. 2, a make-up mirror 19 is fastened, for example by gluing, in the indentation on the exterior side of the plate 8 facing the vehicle roof 3. This indentation is formed by the arrangement of the plate 8 in the recess 7.

In FIG. 2, the adjustable lamellae 14 of the connection opening 13 are also clearly visible. When the sun screen 1 is folded down, the connection opening 13 can be used and operated like a conventional nozzle of an air conditioner. For example, in the event of a briefly increased demand for ventilation, a relatively strong, directed air flow can be formed.

In contrast to the embodiment illustrated in FIG. 1, in the embodiment corresponding to FIG. 2, the sealing 15 on the circumference of the recess 7 is fastened on the exterior side 6 of the sun screen 1 facing the roof 3.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Sun screen for a motor vehicle, which is swivellable about an axis extending essentially transversely with respect to a windshield of the motor vehicle between a first end position, in which the sun screen extends essentially parallel to a vehicle roof, and a second end position, in which the sun screen extends essentially parallel to the windshield, the sun screen having ventilation openings through which an exchange of air can take place between a vehicle interior and an interior of the sun screen which can be connected to an air conditioner of the motor vehicle, comprising:

a roof-side exterior side of the sun screen in which a recess is provided, said recess communicating with the interior of the sun screen, wherein a connection opening of the air conditioner is arranged, in the vehicle interior, in the vehicle roof, the sun screen, in said first end position, being positionable on the vehicle roof such that the connection opening and the recess in the roof-exterior side of the sun screen cover one another.

2. Sun screen according to claim 1, and further comprising at least one sealing device which, in the first end position of the sun screen, is arranged between a circumference framing the recess and a border bounding the connection opening.

3. Sun screen according to claim 2, wherein the at least one sealing device is mounted on the border bounding the connection opening and, in the first end position of the sun screen, sealingly rests on the sun screen on the circumference framing the recess.

4. Sun screen according to claim 2, wherein the at least one sealing device is mounted on the circumference framing the recess and, in the first end position of the sun screen, sealingly comes to rest on the border bounding the connection opening.

5. Sun screen according to claim 1, and further comprising a plate provided in the recess which is sunk relative to the roof-side exterior side of the sun screen and extends essentially parallel to said exterior side, a gap opening being formed between an outer edge of the plate and the circumference framing the recess and communicating with the interior of the sun screen.

6. Sun screen according to claim 5, and further comprising webs arranged in the gap opening which hold the plate on the sun screen.

7. Sun screen according to claim 5 and further comprising a make-up mirror mounted in the recess on the plate.

8. Sun screen according to claim 1, wherein the ventilation openings are arranged in the sun screen between the roof-side exterior side and an exterior side of the sun screen facing the vehicle interior.

9. Sun screen according to claim 8, wherein at least one of the exterior sides of the sun screen is formed at least partially of an air-permeable material which covers the ventilation openings.

10. Sun screen according to claim 1, wherein the connection opening has adjustable lamellae.

11. Sun screen according to claim 8, wherein at least one of the exterior sides of the sun screen is provided with an air-permeable material which covers the ventilation openings.

12. Sun screen according to claim 2, and further comprising a plate provided in the recess which is sunk relative to the roof-side exterior side of the sun screen and extends essentially parallel to said exterior side, a gap opening being formed between an outer edge of the plate and the circumference framing the recess and communicating with the interior of the sun screen.

13. Sun screen according to claim 12, and further comprising webs arranged in the gap opening which hold the plate on the sun screen.

14. Sun screen according to claim 12 and further comprising a make-up mirror mounted in the recess on the plate.

15. Sun screen according to claim 13 and further comprising a make-up mirror mounted in the recess on the plate.

16. Sun screen according to claim 1, wherein an exterior side of the sun screen opposite said roof-side exterior side is formed at least partially of an air-permeable material which covers the ventilation openings.

17. Sun screen according to claim 16, and further comprising a make-up mirror mounted in the recess.

18. Sun screen for a motor vehicle, which is swivellable about an axis with respect to a windshield of the motor vehicle between a first end position, in which the sun screen extends essentially parallel to a vehicle roof, and a second end position, in which the sun screen extends essentially parallel to the windshield, the sun screen comprising:

a central portion including ventilation openings defined therein, and a roof-side exterior side in which a recess is provided, said recess permitting a supply of air to an interior of the sun screen and through the ventilation openings, wherein a connection opening through which the air is supplied is aligned with the recess when the sun screen is in said first end position.

19. Sun screen according to claim 18, and further comprising a make-up mirror mounted in the recess.

20. Sun screen according to claim 19, wherein an exterior side of the sun screen opposite said roof-side exterior side is formed at least partially of an air-permeable material which covers the ventilation openings.

* * * * *